US010825422B2

(12) United States Patent
Fuller et al.

(10) Patent No.: US 10,825,422 B2
(45) Date of Patent: Nov. 3, 2020

(54) WATER DROP TV SCREEN

(71) Applicant: WET, Sun Valley, CA (US)

(72) Inventors: Mark W. Fuller, Studio City, CA (US);
James W. Doyle, Sun Valley, CA (US);
Gautam Rangan, Sun Valley, CA (US);
John Canavan, Sun Valley, CA (US)

(73) Assignee: WET, Sun Valley, CA (US)

( * ) Notice: Subject to any disclaimer, the term of this patent is extended or adjusted under 35 U.S.C. 154(b) by 0 days.

(21) Appl. No.: 16/137,239

(22) Filed: Sep. 20, 2018

(65) Prior Publication Data
US 2019/0122639 A1 Apr. 25, 2019

Related U.S. Application Data

(60) Provisional application No. 62/561,170, filed on Sep. 20, 2017.

(51) Int. Cl.
*G09G 5/36* (2006.01)
*B05C 11/10* (2006.01)
*G09G 3/20* (2006.01)
*H04N 5/64* (2006.01)

(52) U.S. Cl.
CPC .......... *G09G 5/363* (2013.01); *B05C 11/1026* (2013.01); *G09G 3/2092* (2013.01); *H04N 5/64* (2013.01)

(58) Field of Classification Search
CPC ...... G09G 3/003; G09G 5/363; G09G 3/2092; G06T 13/00; G06T 13/20; G06T 13/60; G06T 13/80; G06T 19/006; B05C 11/1026; H04N 5/64
See application file for complete search history.

(56) References Cited

U.S. PATENT DOCUMENTS

| 8,225,539 | B2 | 7/2012 | Beebe |
| 9,199,264 | B2 | 12/2015 | Tom et al. |
| 9,440,251 | B2 | 9/2016 | Lunde et al. |
| 2001/0022563 | A1* | 9/2001 | Ishikawa ................ G09G 3/003 345/9 |

(Continued)

FOREIGN PATENT DOCUMENTS

JP 2017-076003 A 4/2017

OTHER PUBLICATIONS

Diego Martinez Plasencia, Edward Joyce, Sriram Subramanian, MisTable: reach-through personal screens for tabletops, Proceedings of the SIGCHI Conference on Human Factors in Computing Systems, Toronto, Ontario, Canada, Apr. 26-May 1, 2014.*

(Continued)

*Primary Examiner* — Ke Xiao
*Assistant Examiner* — Andrew Shin
(74) *Attorney, Agent, or Firm* — Maceiko IP

(57) ABSTRACT

A display where water is applied onto the screen of a visual display monitor and graphics are presented on the display that coincides with the applied water is described. The timing of the water being applied to the screen and the playing of the graphics may be orchestrated such that the applied water seems to create the presented graphics. A controller may be used to control the water and the display.

14 Claims, 10 Drawing Sheets

(56) References Cited

U.S. PATENT DOCUMENTS

2015/0092266 A1* 4/2015 Yeremian ............... G03B 21/10
359/443
2017/0232464 A1 8/2017 Fuller

OTHER PUBLICATIONS

Erika Okude , Yasuaki Kakehi, Rainterior: an interactive water display with illuminating raindrops, Proceedings of the ACM International Conference on Interactive Tabletops and Surfaces, p. 270-271, Kobe, Japan, Nov. 13-16, 2011.*

* cited by examiner

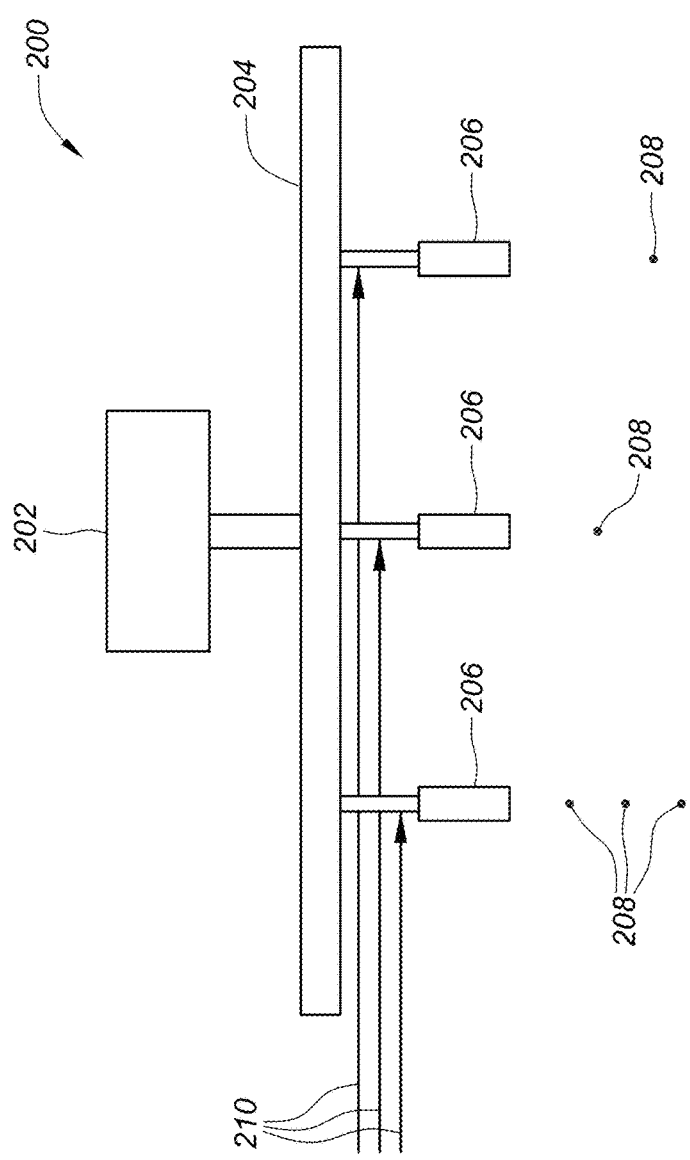
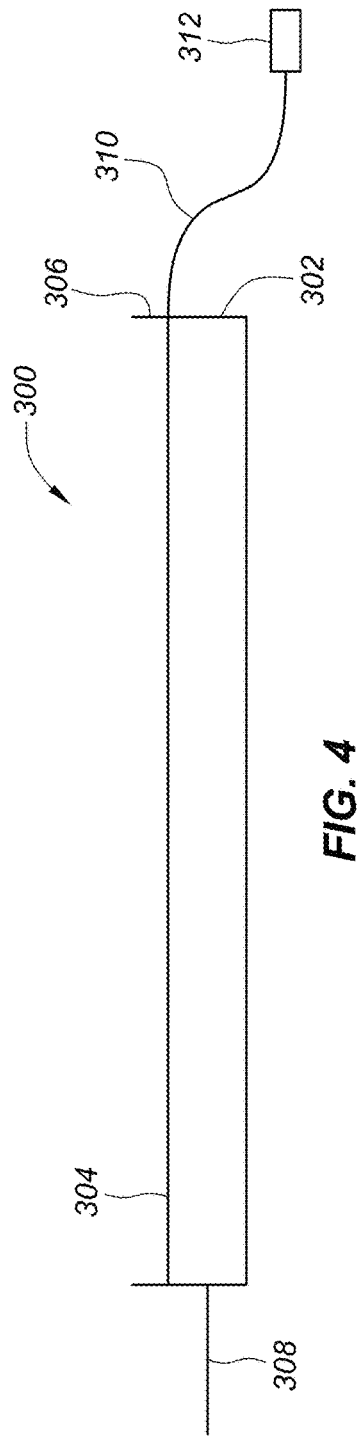
FIG. 3
FIG. 4

WATER DROP TV SCREEN

CROSS-REFERENCE TO RELATED APPLICATION

This application claims the benefit of U.S. Provisional Application No. 62/561,170, filed Sep. 20, 2017, the contents of which are incorporated herein by reference.

FIELD OF THE INVENTION

The current invention generally relates to displays and visual effects, including those involving water and video monitors.

BACKGROUND OF THE INVENTION

Displays that include water have existed for some time. In recent years, advances in video monitor technology resulting in thinner and less expensive display monitors have resulted in such displays being used in new ways, such as at live concerts, sporting events and other types of live entertainment.

However, many existing water displays have not implemented the added visual benefits of video displays and therefore have limitations and other shortcomings.

As such, there is a need to introduce video monitors into water displays to provide enhanced visual effects. For example, there is a need for a water display that incorporates water interacting with the graphics on a video display monitor.

SUMMARY OF THE INVENTION

In a first aspect of the invention, a display involving water and a monitor, such as a flat panel television screen, is described. The display may include water droplets falling from water valves positioned above a display monitor such that the droplets may fall onto the display surface of the monitor. The display monitor may be generally horizontal or in any other orientation and may display graphics, videos, animations and/or other types of visual effects that may be initiated or coincide with the droplets hitting or otherwise engaging the screen.

For example, when a droplet from above hits the display monitor, it may display a video of the ripple effect that would result from a water droplet splashing into a small pool or other body of water. In this way, it may appear that the falling droplet caused the splash and the ripples while in reality they are being presented as a video on the display monitor. In another example, the video monitor may display the results of a stream of water hitting a water surface.

In another aspect of the invention, the display may include a controller that controls the dropping of the water and the graphics that may be displayed on the video monitor. In addition, the controller may control the timing of the graphics such that they may coincide with the landing of the water droplets.

In another aspect of the invention, the controller may send control commands to a microcontroller that may in turn send control commands to a relay switch that may activate the water dropping valves.

In another aspect of the invention, multiple water valves in different formations may be controlled simultaneously to drop multiple droplets of water onto one or more video monitors.

In another aspect of the current invention, the video monitor may include an open upper water tank that may collect and contain the water droplets that may land on the display screen of the monitor. To this end, the open water tank may include a film or other depth of water on the monitor surface that may be contained within the open tank. As the tank fills with water and a shallow pool is formed such that the video monitor is a number of inches below the pool surface, the display may give the illusion that the effects shown on the monitor are water and color patterns happening in the pool of water. In this case, the viewer may be generally unaware of the presence of the monitor below. The water may also be drained.

In another aspect of the invention, the graphic, videos, animation or other visual effects displayed on display monitor may include splashes, ripples, colorful puddles, sparks, fireworks, fire and other types of graphics. In addition, the display may show various water droplets combining to form artwork, logos, text or other visual elements.

In another example of how the current invention may be configured, the monitor may resemble a sheet of glass and a solid object may be dropped thereon (though not with a force that would break the monitor). In this embodiment, the monitor may then display glass breaking.

In another aspect of the invention, the display may include multiple video monitors of different sizes and shapes positioned in any orientation or angle with respect to one another.

In yet another aspect of the invention, multiple video displays may be positioned as "tiles" to form a matrix or other pattern or shape.

In another aspect of the current invention, a manifold may drop a multitude of water droplets to emulate falling rain onto the video monitors to give the appearance that the rain is painting the colorful graphics that are shown on the monitors.

In another aspect of the current invention, one or more water delivery devices may be used to shoot water droplets, water streams or other types of water formations onto the display monitors. The water delivery devices may be mounted on movable mounts such that the streams may be shot in any direction and may be used to write or draw images or text on the monitors while the monitors display the appropriate visual images.

In another aspect of the invention, the display monitors may be placed in a variety of positions such as on a wall or in the basin of a water fountain.

The embodiments described above may include an audio component that is programmed to coincide with the visual effects.

Other aspects of the invention are discussed herein.

BRIEF DESCRIPTION OF THE DRAWINGS

FIG. 3 is a block diagram of a water delivery assembly including water valves.

FIG. 4 is a block diagram of a visual display assembly.

DETAILED DESCRIPTION OF THE PREFERRED EMBODIMENTS

Figure 1:
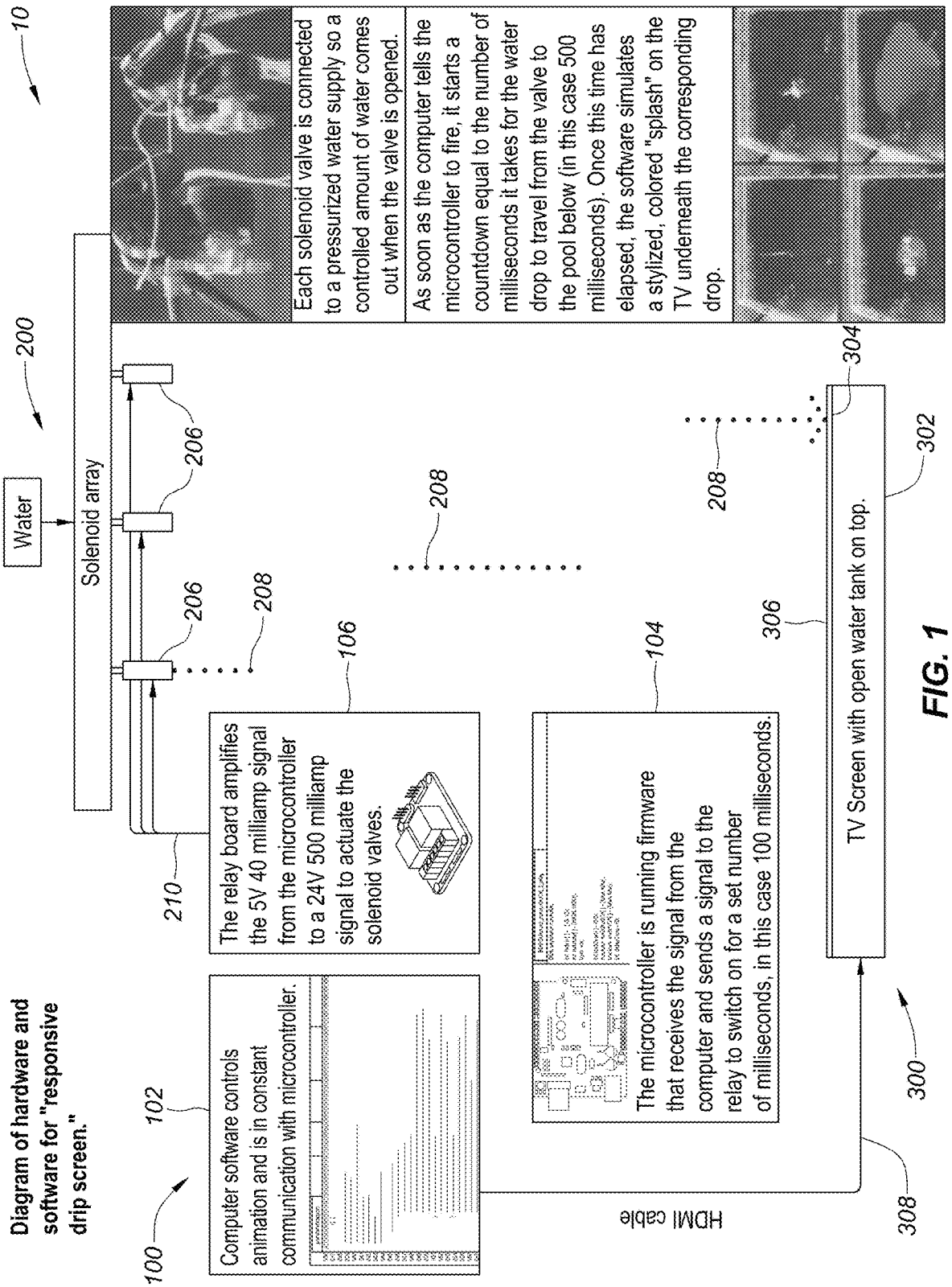
FIG. 1 is a block diagram of a control assembly, a water delivery assembly and a visual display assembly.

The following detailed description is not intended to limit the current invention. Alternate embodiments and variations of the subject matter described herein will be apparent to those skilled in the art.

The display 10 of the current invention and the visual effects that it may produce are now described with reference to the figures. Where the same or similar components appear in more than one figure, they are identified by the same or similar reference numerals.

In general, display 10 provides dramatic visual effects by applying liquid onto a display screen while the display screen presents graphic presentations, videos, animations or other types of effects to enhance the interaction of the liquid and the screen. Display 10 may be installed inside hotels, restaurants, public buildings or in atriums, lobbies or other indoor locations. Display 10 may also be installed in outdoor spaces such as parks, amusement areas, outdoor dining or bars, poolside or in other types of outdoor spaces. As such, display 10 may provide an attraction to these buildings and spaces. Display 10 may also be included in existing water, lighting, fire or other types of displays to provide enhanced visual effects.

In one embodiment as shown in FIG. 1, display 10 may include controller assembly 100, water delivery assembly 200 and visual screen assembly 300. Additional components and/or assemblies may also be included as described below. In general, controller assembly 100 may send a control signal to water delivery assembly 200 to open valve 206 to release a droplet 208 of water or other liquid. (As an alternative, valve 206 may release a stream of water, a solid object or other item.)

Valve 206 may be generally configured and positioned above visual display assembly 300 such that the water droplet 208 may fall through the air and land on the visual display assembly 300. In this embodiment, visual display assembly 300 may include a monitor 302 with a display screen 304 that may be positioned in a generally horizontal configuration facing generally upward as depicted so that droplet 208 may land on and generally engage display screen 304.

In addition, controller assembly 100 may determine or otherwise be programmed to know or identify the length of time it may take for droplet 208, after the command has been sent for its release, to fall through the air and land on display screen 304. Accordingly, controller may wait an appropriate amount of time and then instruct visual display assembly 200 to display graphics that may represent or otherwise enhance the landing of the droplet 208 onto the display screen 304.

It is preferred that the timing of this sequence of events be such that the instant that droplet 208 lands on display screen 304, display screen 304 may display a series of graphics or animations that may represent or otherwise correspond to the landing of droplet 208. For example, video screen 304 may display a "splash" video that shows a droplet landing in a pool of water and resulting in a splash and ripples extending outward across the screen 304. Other types of graphics, animations or videos may also be presented as described in later sections.

Figure 2:
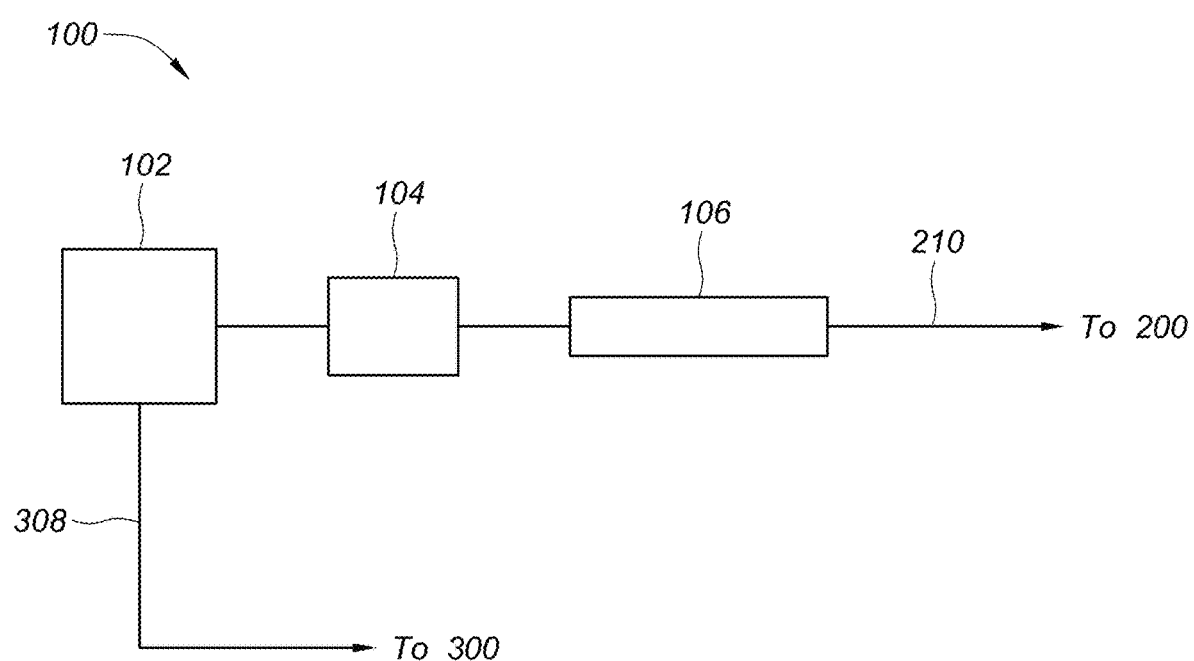
FIG. 2 is a block diagram of a control assembly.

Controller assembly 100 is now described in further detail with reference to FIG. 2. As depicted, controller assembly 100 may comprise controller 102 that may include a computer or other type of controller that may run firmware and/or control software. Controller 102 may also be configured with microcontroller 104 that may run firmware that enables it to perform its specific functions. The controller 102 and the microcontroller 104 may be configured through a serial port or other type of communication link. In addition, microcontroller 104 may be configured with switching assembly 106 that may include a relay board, a series of switches, multiplexors or other types of signal processing devices.

Switching assembly 106 may then be configured with water delivery assembly 200 and may direct control signals to the various valves 206 and other components that may be included within water delivery assembly 200 to release droplets 208. While control assembly 100 is described above as including a microcontroller 104 and switching assembly 106, control assembly 100 may send control signals to water delivery assembly 200 directly or may utilize other types of components or mechanisms to control water delivery assembly 200.

Controller 102 may run software that generally controls the choreography of display 10 in regards to the releasing of the liquid droplets 208 from water delivery assembly 200 as well as the display of the graphics on visual screen assembly 300. Accordingly, controller 102 may include all the necessary hardware, software, information, commands, addresses, code, ports and other components and/or information that may be necessary to perform its functions. Controller 102 may also provide for an audio effect by sending signals to nearby speakers so that, for example, a splashing sound accompanies the visual display.

During use, the software running on controller 102 may instruct controller 102 to send a control signal to microcontroller 104. This control signal may include a trigger and/or other types of instructions, information or commands that may dictate or otherwise determine the size, timing, duration, location and other characteristics of one or more droplets 208 to be released.

Upon receiving these instructions, microcontroller 104 may send a control signal to switching assembly 106 instructing it to actuate one or more valves 206 within water delivery assembly 200 for a specific period of time in order to generate a droplet 208 of a particular size or shape. For example, microcontroller 104 may send a single voltage pulse with a width of 100 milliseconds such that switching assembly 106 may actuate a particular valve 206 for this same or a similar amount of time in order to release a droplet 208 of a particular size and duration. Microcontroller 104 may utilize and send other types of signals as well to control switching assembly 200.

In addition, the signal sent by microcontroller 102 may be somewhat low voltage and current, for example, such as 5V/40 milliamps, such that it may be necessary for switching assembly 106 to amplify the signal to a higher voltage and current, to for example, 24V/500 milliamps, in order to actuate valves 206. Other voltages and currents may also be utilized.

Switching assembly 106 may include a relay board, multiplexor or other type of signal switching device and may be normally open (NO), normally closed (NC), single break, double break, single throw, double throw or may have any other characteristics necessary for it to adequately perform its functionalities. In addition, switching assembly 106 may include a single switch, pole or relay, or may include a multitude of switches, poles or relays. In this way, switching assembly 106 may be configured with and may control one or more valves 206 individually within water delivery assembly 200 simultaneously as required.

In the case of multiple valves 206 being controlled individually by controller assembly 100, each valve 206 may have a unique address, location or other type of identifying characteristic, and switch assembly 106 may be wired or otherwise configured with each valve 206 individually. That is, switch assembly 106 may have a dedicated relay for each valve 206 to be actuated. In addition, microcontroller 104 may be wired or otherwise configured with each unique relay within switching assembly 106 such it may control each unique relay and therefore, in effect, control each unique valve 206.

Controller 102 may then provide instructions to microcontroller 104 to activate a specific valve 206 at a particular address or location at a particular time, and microcontroller 104 may thereby send the appropriate control signals to the appropriate relays within switching assembly 106 to activate the appropriate valve 206.

Controller assembly 100 may control a number of valves 206 individually, either simultaneously or in sequences. Alternatively, multiple groups, series or different formations of valves 206 may also be configured with switching assembly 106 to be controlled independently or in unison.

Water delivery assembly 200 is now described with reference to FIG. 3. Water delivery assembly 200 may include water supply 202 that may be a pressurized water supply or other type of water supply. Water supply 202 may be configured to supply pressurized water to valve array 204 and to valves 206 that may be configured within valve array 204. Valves 206 may be solenoid valves or other types of valves that may be controlled via control lines 110 leading from switching assembly 106 to valves 206. In this way, valves 206 may receive control signals from switching assembly 106 through control lines 110 to be instructed to actuate for a specific duration and volume to thereby release water droplets 208 of a specific size, shape and duration.

While three valves 206 are depicted in FIG. 3, more than three valves 206 may be utilized. For example, dozens or even hundreds or thousands of valves 206 may be employed. Also, while valve array 204 depicts valves 206 in a linear array, any formation of valves 206 may be used, such as a matrix, concentric circles, or any formation of any form or geometry of different valves 206. In addition, water delivery assembly 200 may include more than one valve array 204 that may be of any form or shape and in any location. Valve assemblies 204 and valves 206 may also be positioned at different distances from screen 302.

It should be also noted that water delivery assembly 200 may deliver forms of water other than droplets 208 such as trickles, streams or other types of water formations. This will be described in later sections as well. Other types of liquids may also be used. As another alternative, delivery assembly 200 may be configured to drop solid items that may engage monitor assembly 300 to simulate, for example, breaking glass.

As depicted in FIG. 4, visual screen assembly 300 may include monitor 302 having display screen 304 that may display a wide variety of graphics, videos, animations, pictures and other types of visual elements. As shown, monitor 302 may be configured in a generally horizontal position such that water droplet 208 falling through the air generally intersects screen 304. In addition, monitor 302 may be configured in any position, orientation and at any angle.

It should be noted that video monitor 302 may comprise any type of monitor that may be adequate in displaying graphics as described in this specification. However, it may be preferable that monitor 302 be a high resolution monitor such that the graphics are presented as sharp and colorful images. To this end, video monitor 302 may be a cathode ray tube (CRT), a liquid crystal display (LCD), a light-emitting diode display (LED), a plasma display or any other type of display. In addition, video monitor 302 may include a rear projection screen and projector. In this case, video monitor 302 may comprise a suitable surface for rear projection, such as a translucent film, screen or other surface, and a rear projector placed generally beneath the surface to project the graphics onto the surface from below.

Monitor 302 may also be configured with open water tank 306 generally positioned on top of monitor 302, such that droplets 208 falling onto monitor 302 may be generally contained therein. Open tank 306 may generally cover the area of display 302 and be water tight. This way the full viewing area of the monitor 302 may be visible and water droplets 208 may be held within tank 306 and restricted from flowing over the edges of the monitor 302. In addition, water tank 306 may include water outlet line 310 that may allow the water that may collect in water tank 306 to be released into to water reserve 312 for removal as necessary.

As an alternative, monitor assembly 300 may be configured so that open tank 306 contains a film or layer or some other depth of water or other liquid. The open tank 306 may contain a shallow pool of water such that the monitor is a number of inches below the surface of the water within the tank 306. For example, the monitor 302 may be one-eighth of one inch to two inches below the surface of the pool, may be two to five inches below the surface of the pool, or may be at a distance greater than five inches below the surface of the pool. In this configuration, when droplets 208 land on monitor 302, a physical splash and rippling of the water layer may result. This may be enhanced by the video displayed by monitor screen 304 and color patterns displayed on the monitor 302 may appear to be happening within the pool of water. In this case, the viewer may be generally unaware of the presence of the monitor 302 below. In addition, the colors or other display provided by screen 304 may be magnified, distorted or otherwise enhanced by the layer of water. The water layer may be released into water reserve 312 as desired.

Visual screen assembly 300 may be configured with control assembly 100 through control line 308 that may include an HDMI cable or other type of control line. This way, controller assembly 100 may send videos, animations, graphics, pictures and other visual elements to visual screen assembly 300 to be displayed in unison with the dropping droplets 208 as described above. Other control lines may be included to provide, for example, audio signals to nearby speakers.

As used herein, the term graphic 314 may mean any type of video, animation, artwork, picture, photograph, illustration or any other type of visual elements that may be shown or otherwise represented on video monitor 302. For example, display graphics 314 may include colorful water videos or simulations of water dropping into a pool or forming a puddle. For example, when water droplet 208 hits the top surface of monitor 302 or open water tank 306, video monitor 302 may display a video of a water droplet hitting the video monitor 302 at generally the same location as the actual water droplet 208 may hit the screen 302 or tank 306. That is, the positioning of droplet 208 and the resulting video correspond, e.g., the displayed point of impact on monitor screen 304 is aligned to be generally underneath the drop 208 of real water from the specific water valve 206. In this way, the video representation on display 304, e.g., the point of impact and ripples emanating therefrom, may appear to be caused by the landing water droplet 208.

In addition, the video may show the water droplet turning different colors as it splashes and runs and send ripples across the screen 302. Or, the simulated droplet may turn into a puddle of colorful liquid and flow across the screen 302. If there are multiple water droplets 208 falling from multiple valves 206, the video or animation that may play on monitor 302 may include simulated droplets splashing on monitor 302, along with the ripple pattern emanating therefrom, for each unique droplet 208 that may intersect monitor 302.

In addition, each graphic 314 for each individual droplet 208 may be visually different in order to create an entertaining visual effect. For example, different graphics 314 displayed simultaneously for different droplets 208 may appear in different colors so that the different droplets 208 may appear to be different colors as they hit the screen 302.

This is depicted in FIGS. 5A-5D. As shown, different puddles or sections 314A, 314B may be displayed. And as shown in the sequence represented by FIGS. 5A-5B, sections 314A, 314B may change shape, color or in other ways. Display 10 may involve any number of sections 314.

Other types of graphics 314, videos or animations may also be displayed for the different droplets 208. For example, one video may show sparks or fire being emitted on screen 302 when droplets 208 land. In another example, fireworks may be displayed as the droplets 208 hit the screen 302. In yet another example, the different droplets 208 that hit screen 302 may turn different colors and combine to form different artwork such as paintings of landscapes, replicas of masterpieces, photographs, abstract art, comic book graphics or other types of artwork animations.

Graphics 314 may also be displayed that show the different droplets 208 combining to form logos of companies, words or text or other types of elements. In sum, any type of graphic, video, animation or other types of visual effects may be displayed in conjunction with the falling droplets 208 intersecting screen 302. Music or other sound effects such as the sound of water splashing may also be played and choreographed with the falling drops 208, or streams of water or solid objects.

As stated above, controller assembly 100 may send commands to microcontroller 102 to actuate one or more valves 206 to release droplets 208 in a choreographed arrangement; and may then pause for a period of time that may be equivalent to the time it takes for the commands to actuate valves 206, for the water droplets 208 to be released, and for the droplets 208 to fall through the air and intersect video monitor 302 or water within open water tank 306.

For example, this amount of time may be 500 milliseconds. Then, at the end of this time, controller 102 may send the desired graphics 314 to visual screen assembly 300 to be displayed.

It should be noted that the amount of time that controller 102 may pause may be determined by knowing the different time intervals associated with each step of the water dropping process and then summing these intervals together to result in a total time. Regarding the hardware components' reaction times, these time intervals may each be measured or may be provided by the component manufacturers. In addition, the amount of time it may take for droplet 208 to fall from valve 206 to the display monitor 302 may be determined by knowing the distance between the valve 206 and the display monitor 302 and the speed at which the drop may fall, and then calculating the fall time. In addition, this amount of time may be physically measured. For valves 206 that are positioned at different distances from monitor 302, the fall time of the respective droplets 208 may be different, and these different fall times may be known and stored within controller 102 to be utilized accordingly.

The system may also be calibrated by releasing droplets 208 and then adjusting the delay time to visually synchronize the graphics with the landing of the various water droplets 208. This adjustment may be manual or may be automated through software.

While FIGS. 1 and 4 depict a single display monitor 302, display 10 may include multiple display monitors 302 of different sizes and shapes. In addition, the angle and positioning of one or more display monitors 302 may vary. For example, a variety of different display monitors 302 may be arranged in different angles with respect to one another or in other positions. In this scenario, each monitor 302 may utilize its own dedicated set of valves 206 or valve arrays 204, or particular valves 206 and valve arrays 204 may be shared amongst the monitors 302.

Figure 5A:
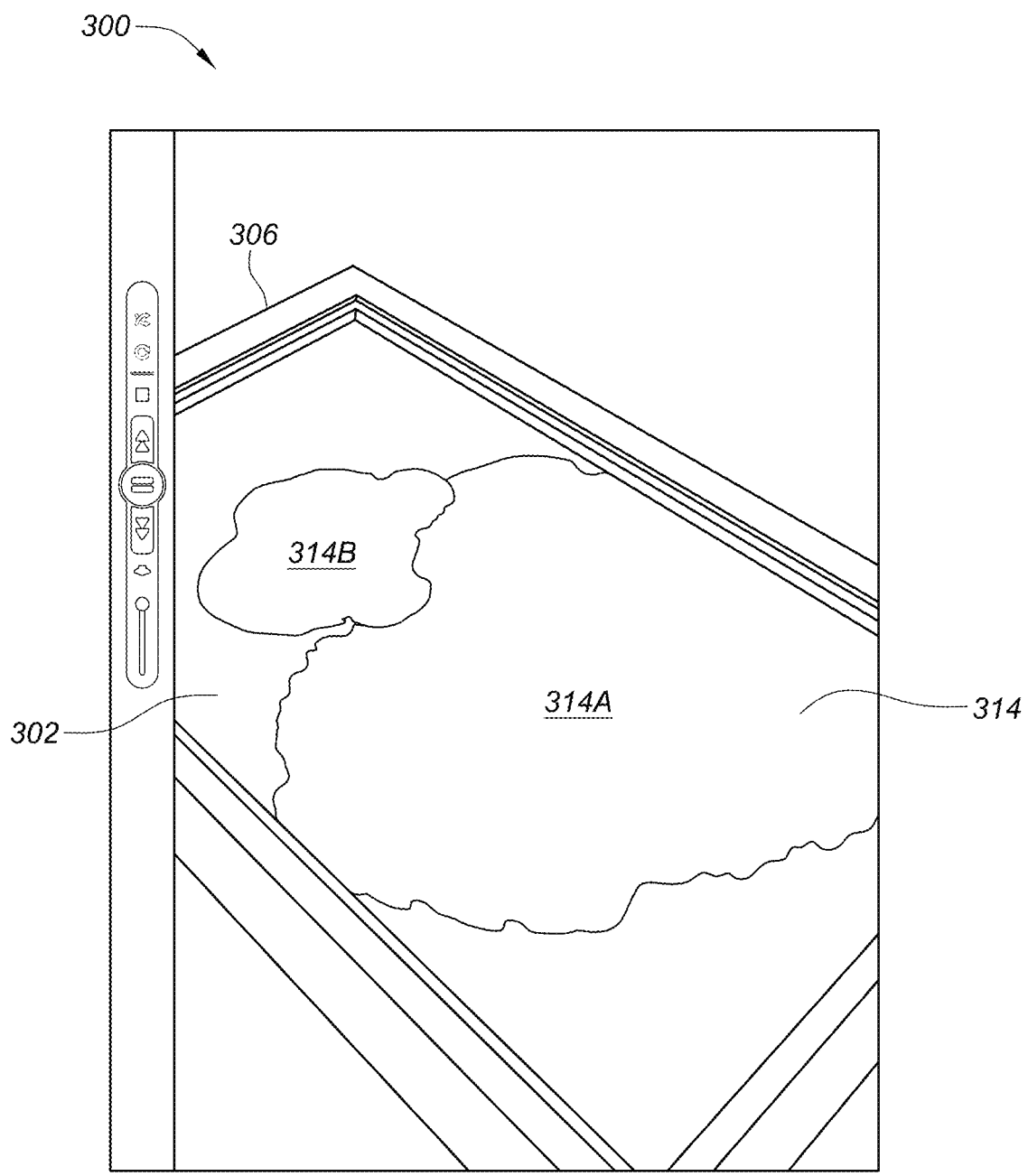
FIGS. 5A-5D are images of display graphics on a video monitor.
Figure 5B:
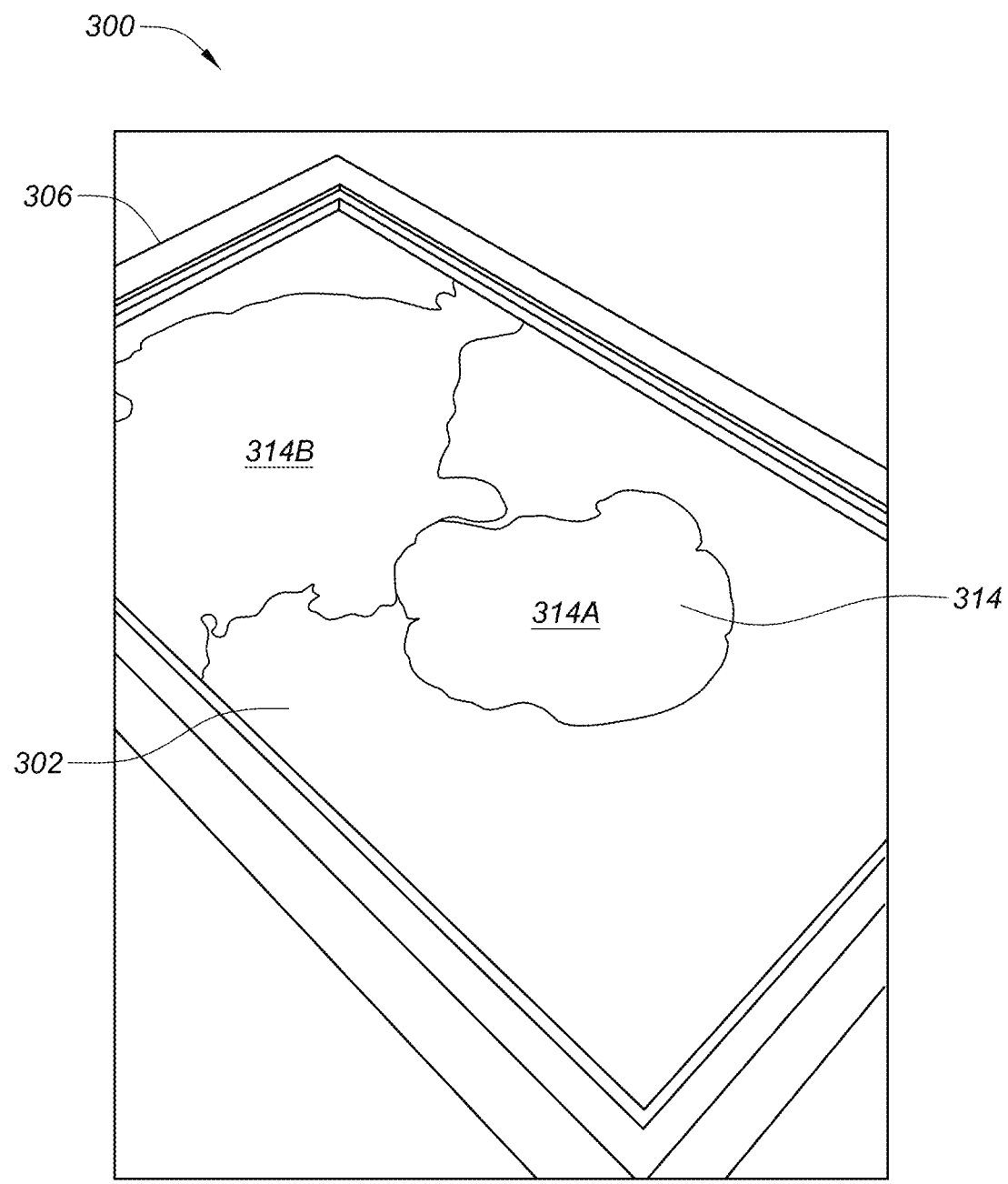
Figure 5C:
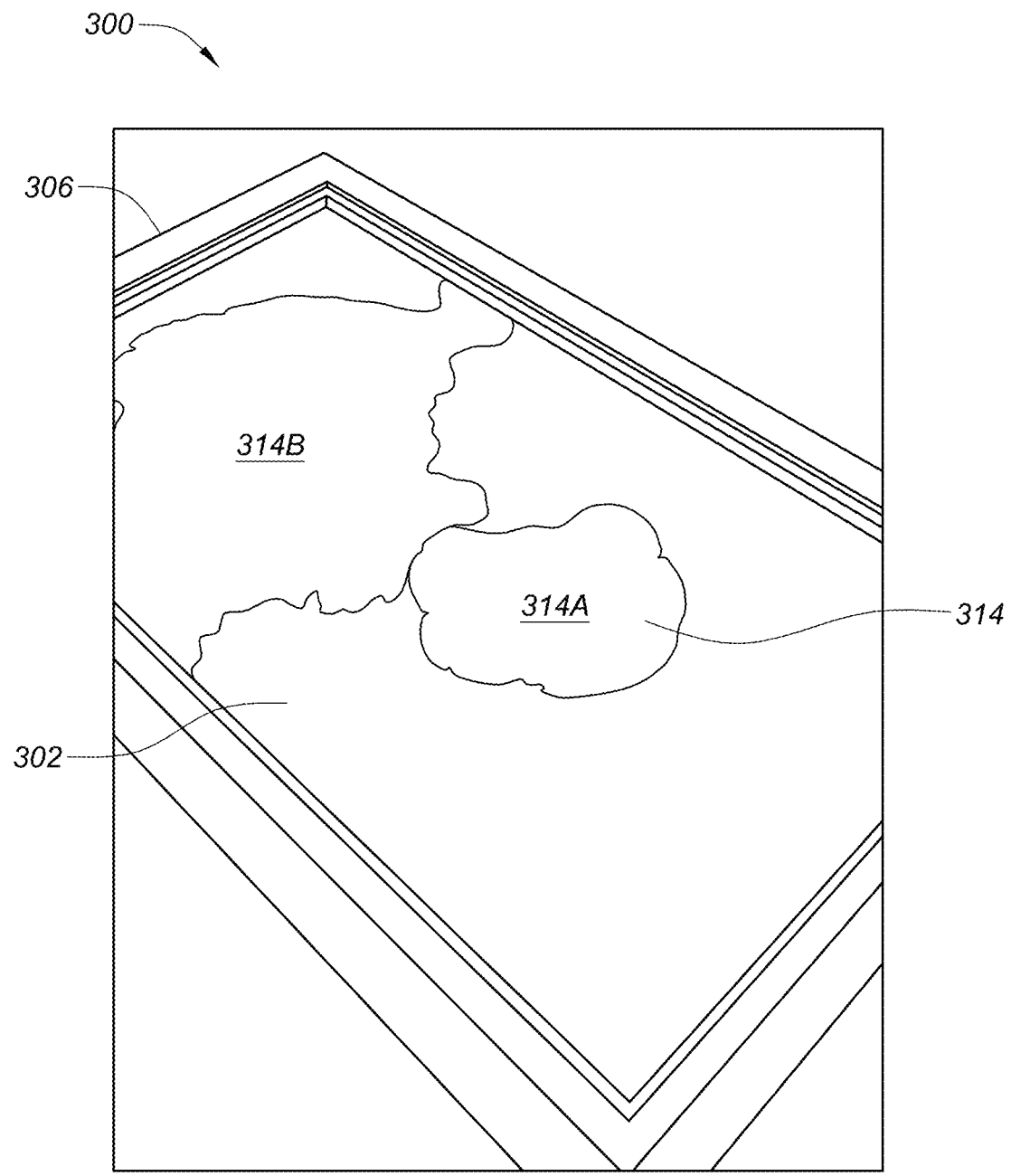
Figure 5D:
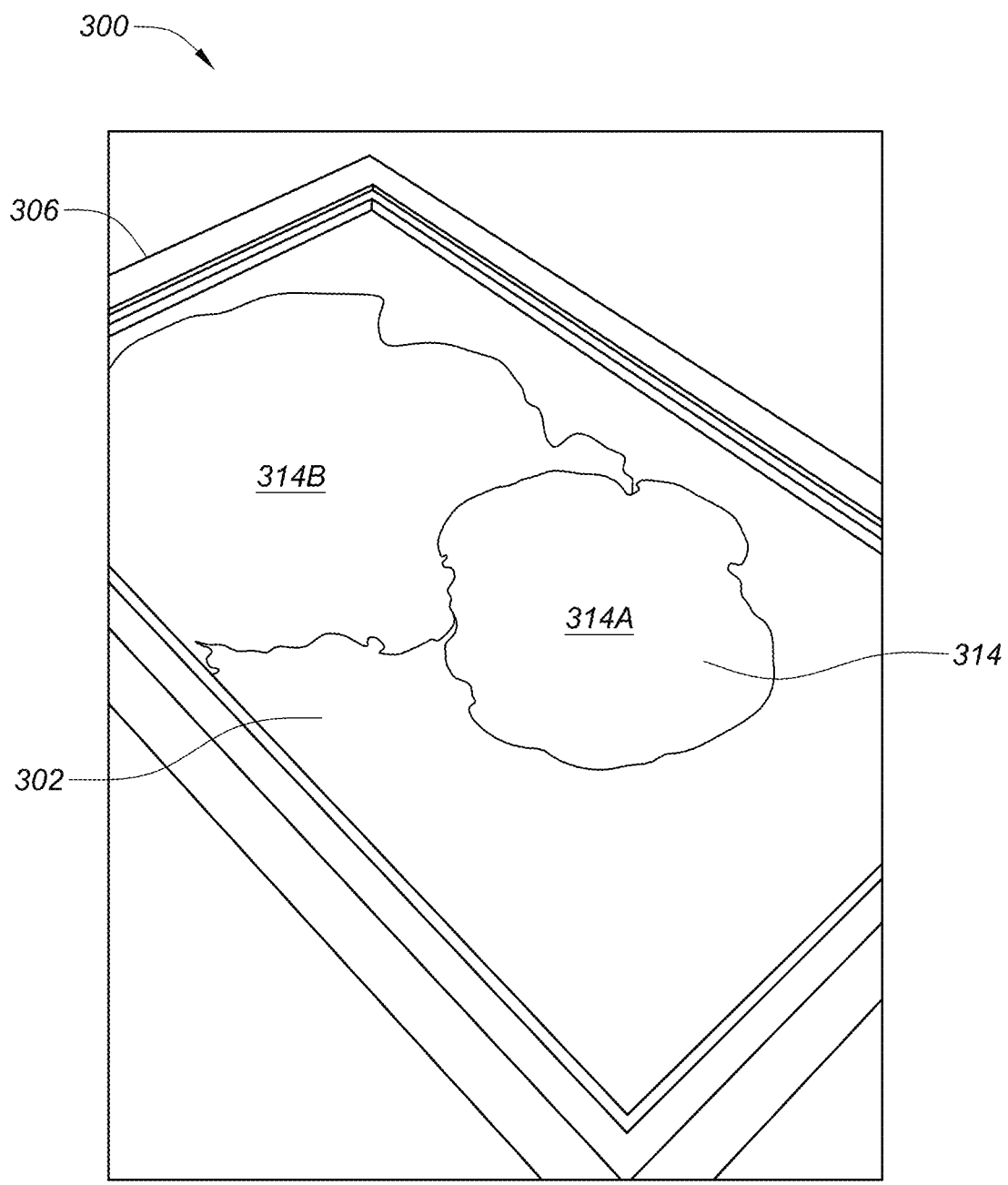
Figure 5E:
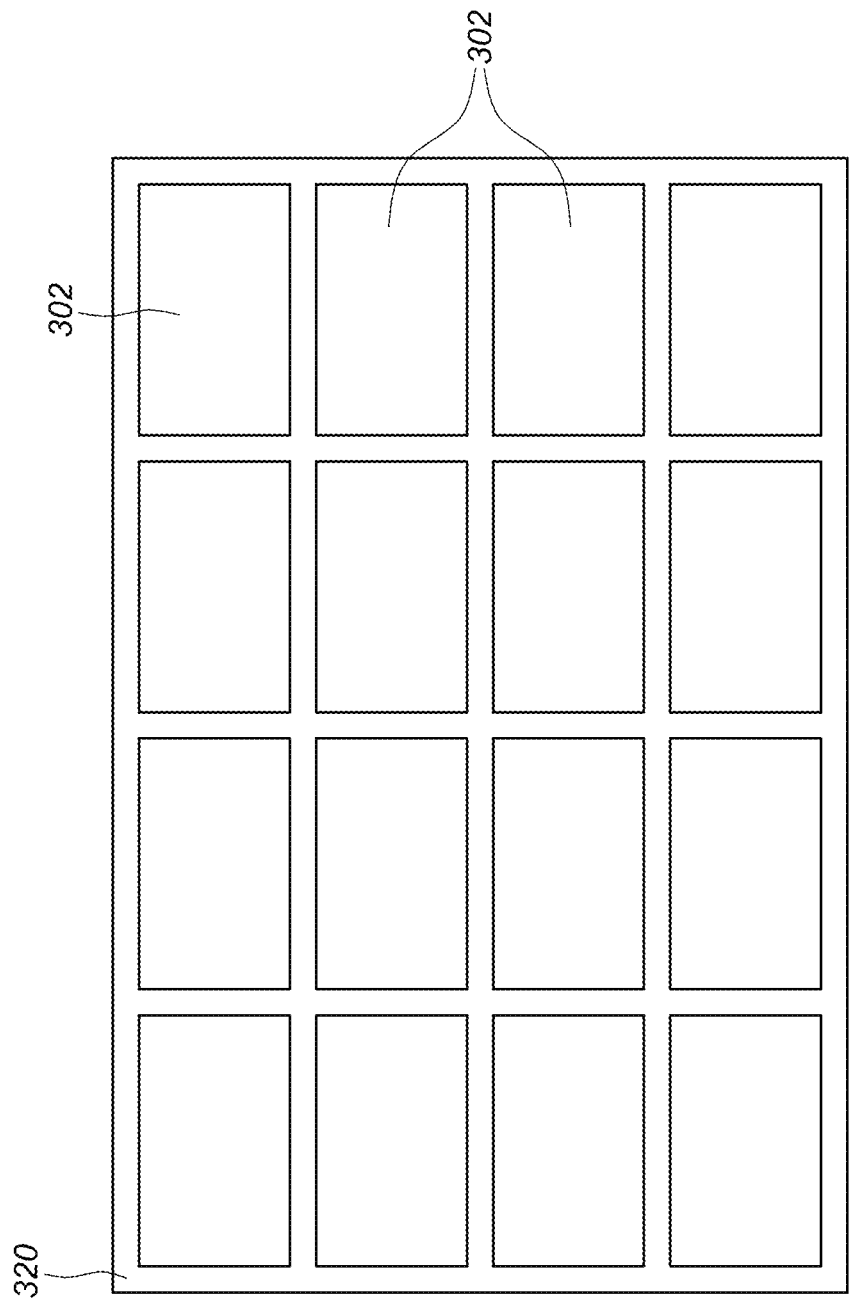
FIG. 5E is a top view of multiple video monitors arranged in a matrix.

In one example, display 10 may include a multitude of video monitors 302 that may be arranged side-by-side to form a matrix or other pattern as "tiles" to create an aggregate video surface that may be larger than a single video monitor 302. In this case, each video monitor 302 may include brackets, frames, latches or other attachment mechanisms that may allow for the multiple video monitors 302 to be attached together to form the pattern. Note that it may be preferable for the monitors 302 to be configured together in a water tight fashion between the individual monitors 302 such that no water may leak or otherwise drain out between their adjoining sides. To this end, the monitors 302 may be held together within a gasket 320 or other type of water tight membrane or fixture as depicted in FIG. 5E. Gasket 320 may comprise rubber or other type of material that may secure the sides of monitors 302 together without any gaps while allowing each display screen 304 to be visible and accessible for use in display 10. Note that while FIG. 5E depicts sixteen video monitors 302 in four rows of four per each row, any number of video monitors 302 may be used in any pattern or formation.

Note that in this example, open water tank 306 may extend across one, several or all of the video monitors 302 across the matrix. That is, each video monitor 302 may include its own individual open water tank 306, or since the video monitors 302 may be configured together in an water tight fashion, the open tank 306 may extend across several or all of the video monitors 302 combined.

Figure 6:
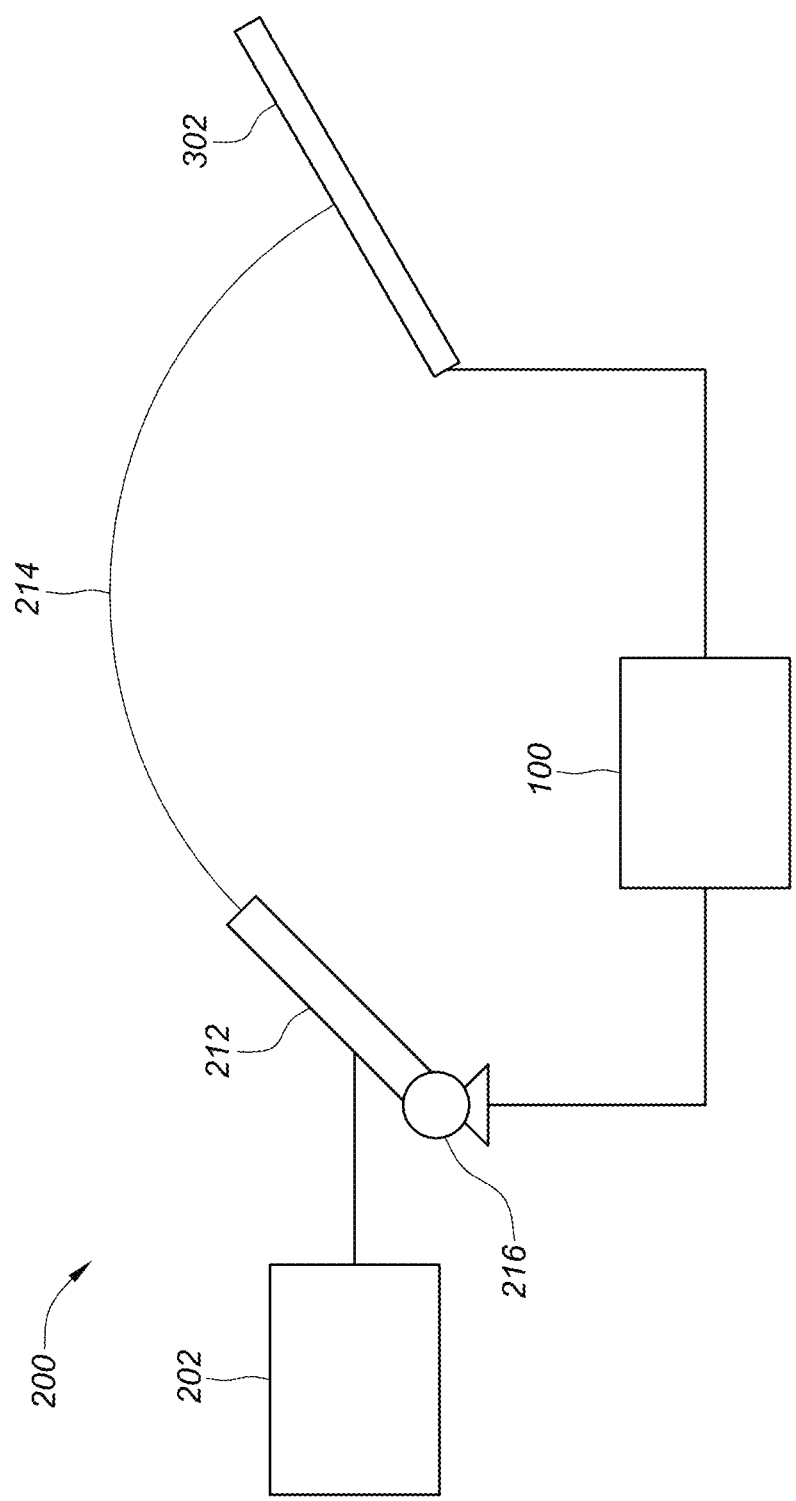
FIG. 6 is a block diagram of a water delivery assembly including a water delivery device.

In yet another example, water delivery assembly 200 may include water delivery devices, water jets, or other types of water emitting devices that may delivery water droplets or water streams to monitors 302. In one example as depicted in FIG. 6, water delivery assembly 200 may include one or more water jets 212 that may emit water stream 214 that may engage display monitor 302. In this embodiment, controller assembly 100 may control water jets 212 in a similar fashion as it controlled valves 206 as well as the graphics 314 that may be presented on display monitor 212. Water jet 212 may be mounted on movable mount 216 so that the direction of water jet 212 and thus the direction of water stream 214 may be adjusted in real time. The range of motion for water jet 212 may be increased with movable mount 216 up to 360° in all directions so that water stream 214 may be pointed at any target. In addition, water jet 212 may emit pulsed water bursts, water streams, blooms, droplets or any other types of water streams or formations.

The general details and characteristics regarding the prior embodiments of the current invention may apply to this embodiment as well. For example, controller 102 may send water delivery assembly 200 a control signal for water jet 212 to shoot a water stream 214, and then controller 102 may wait the appropriate amount of time before displaying graphics on display 302 to coincide with the water stream 214 intersecting the display 302. In addition, any number of water jet in any formation may be utilized with any number of display monitors 302 in any arrangement.

In one example of this embodiment, display monitors 302 may be arranged on the walls of an installation and water jet Water jet 212 may be controlled to shoot water streams 214 that seem to write text or draw pictures on the monitors 302, with the graphics being displayed on the monitors 302 showing the text or pictures that are being drawn. In another example, the video monitors 302 may form the basin of a water fountain such that the various water streams 214 shot by the water jets 212 or other types of water delivery devices within the fountain may fall onto the monitors 302 within the basin while colorful graphics of all kinds are displayed on the monitors to coincide with the landing water droplets 208 or streams 214.

Figure 5F:
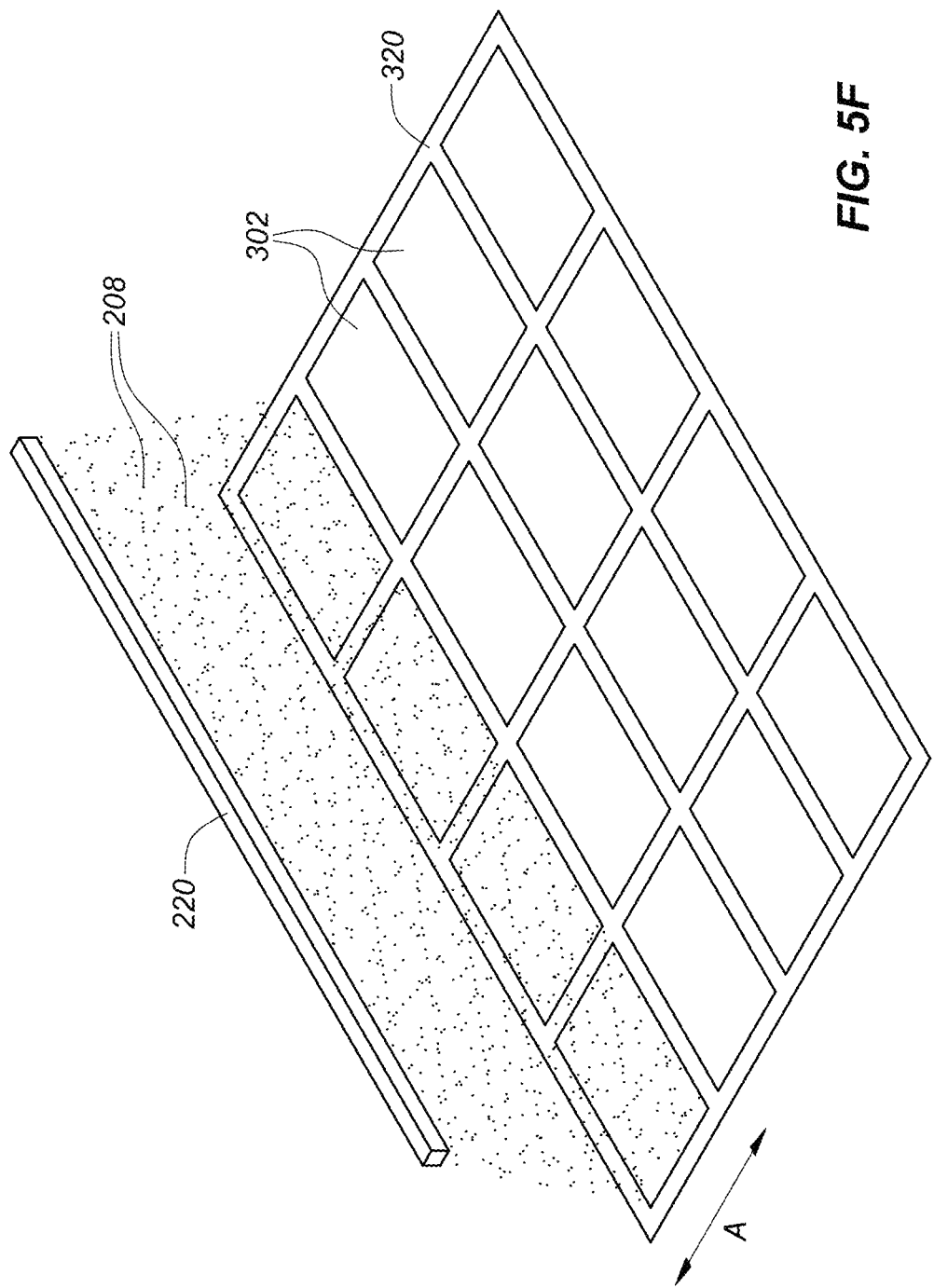
FIG. 5F is a perspective view of a water delivery device dropping water droplets onto video monitors.

In another example as depicted in FIG. 5F, water delivery assembly 200 may include a bar, sprayer or manifold 220 that may emit a multitude of droplets 208 at once that may resemble falling rain onto video monitors 302. The manifold 220 may be positioned at a height above monitors 302 similar to the other examples described in sections above and may move across the matrix of monitors 302 in different directions, for example, in the direction of arrows A. As the manifold 220 moves and emits droplets 208, the video monitors 302 may display colorful graphics that coincide with the rain hitting the monitors 302 as described in prior sections. In this example, the falling rain droplets 208 may appear to "paint" the graphics that appear on the monitors 302. In addition, if monitors 302 include an open tank 306, the rain droplets 208 may fall into the pool that may be contained within open tank 306 and the graphics displayed by monitors 302 may appear to be painted onto the surface of the pool by the falling rain droplets 208.

It should be noted that while FIG. 5F depicts manifold 220 generally as a rectangular bar, manifold 220 may be any type of water delivery device or sprayer that is capable of dropping a multitude of water droplets 208 that resemble falling rain. In addition, more than one manifold 220 may be utilized. Also, while FIG. 5F depicts manifold 220 moving in the direction of arrows A across the matrix of video monitors 302, manifold 220 may move in any direction with respect to monitors 302. In addition, while FIG. 5F depicts a multitude of monitors 302 positioned side-by-side within gasket 320 to form a generally flat matrix as shown in FIG. 5F, manifold 220 may be utilized with a single video monitor 302, or with a multitude of video monitors 302 positioned in any pattern, shape or form, at any angle with respect to each other, and with or without gasket 320.

Although certain presently preferred embodiments of the invention have been described herein, it will be apparent to those skilled in the art to which the invention pertains that variations and modifications of the described embodiments may be made without departing from the spirit and scope of the invention.

What is claimed is:

1. A display, comprising:
   a water delivery device that releases water;
   a monitor;
   an open water tank configured on top of the monitor that collects the released water; and
   a controller;
   wherein the released water intersects the monitor or the surface of water contained by the open water tank, and the monitor displays graphics that coincide with the released water; and
   wherein the controller controls the release of the water and waits a predetermined amount of time before controlling the graphics.

2. The display of claim 1, wherein the monitor is located at a depth below the surface of water contained by the open water tank.

3. The display of claim 1, wherein the predetermined amount of time corresponds to the time it takes the released water to intersect the monitor or the surface of water contained by the open water tank.

4. The display of claim 3, wherein the controller initiates the graphics at the predetermined time.

5. A display, comprising:
   a delivery device that releases liquid;
   a visual display assembly that is positioned so that the released liquid lands on the visual display assembly or on a surface of a volume of liquid on top of the visual display assembly, and that displays a visual effect; and
   a controller that controls the release of the liquid from the delivery device and that controls the display of the visual effect by the visual display assembly;
   wherein the visual display assembly displays the visual effect to coincide with the landing of the released liquid on the visual display assembly or on the surface of the volume of liquid on top of the visual display assembly.

6. The display of claim 5, wherein the delivery device releases the liquid in a downward path, and at least part of the visual display assembly is positioned under the delivery device and in the downward path.

7. The display of claim 5, further comprising an open tank that is located on top of the visual display assembly and that collects the released liquid.

8. The display of claim 7, wherein the open tank contains the volume of liquid on top of the visual display assembly.

9. The display of claim 5, wherein the delivery device includes one or more valves that release the liquid.

10. The display of claim 5, wherein the controller sends a signal to the delivery device to release the liquid, and after a predetermined amount of time, sends another signal to the visual display assembly to display the visual effect, wherein the predetermined amount of time corresponds to the time it takes for the released liquid to land on the visual display assembly or on the surface of the volume of liquid on top of the visual display assembly.

11. The display of claim 5, wherein the visual display assembly includes a monitor.

12. The display of claim 5, wherein the liquid comprises water.

13. The display of claim 5, wherein the visual effect comprises a splash, ripple, colorful puddle, sparks, fireworks or fire.

14. The display of claim 5, further comprising one or more speakers, wherein the controller sends one or more signals to the one or more speakers that provides an audio effect.

* * * * *